(12) United States Patent
St. Hilaire

(10) Patent No.: US 11,009,718 B2
(45) Date of Patent: May 18, 2021

(54) SPECKLE-REDUCTION IN VIRTUAL AND AUGMENTED REALITY SYSTEMS AND METHODS

(71) Applicant: MAGIC LEAP, INC., Plantation, FL (US)

(72) Inventor: Pierre St. Hilaire, Belmont, CA (US)

(73) Assignee: Magic Leap, Inc., Plantation, FL (US)

( * ) Notice: Subject to any disclaimer, the term of this patent is extended or adjusted under 35 U.S.C. 154(b) by 9 days.

(21) Appl. No.: 16/028,313

(22) Filed: Jul. 5, 2018

(65) Prior Publication Data

US 2019/0011722 A1 Jan. 10, 2019

Related U.S. Application Data

(60) Provisional application No. 62/529,223, filed on Jul. 6, 2017.

(51) Int. Cl.
*G02B 27/48* (2006.01)
*G06T 19/00* (2011.01)
*G02B 27/01* (2006.01)
*G02B 26/10* (2006.01)

(52) U.S. Cl.
CPC ......... *G02B 27/48* (2013.01); *G02B 27/017* (2013.01); *G02B 27/0172* (2013.01); *G06T 19/006* (2013.01); *G02B 26/10* (2013.01); *G02B 2027/012* (2013.01)

(58) Field of Classification Search
CPC .. G02B 27/48; G02B 27/0172; G02B 27/017; G02B 2027/012; G02B 26/10; G06T 19/006

USPC .......................................................... 345/8
See application file for complete search history.

(56) References Cited

U.S. PATENT DOCUMENTS

| 6,724,354 | B1 | 4/2004 | Spitzer et al. |
| 9,046,697 | B2 | 6/2015 | Manni et al. |
| 2002/0126981 | A1 | 9/2002 | Roddy et al. |
| 2002/0154375 | A1* | 10/2002 | Roddy ................. H04N 9/3105 359/287 |
| 2006/0228073 | A1 | 10/2006 | Mukawa et al. |
| 2007/0159673 | A1* | 7/2007 | Freeman ............... G02B 5/1814 359/19 |

(Continued)

FOREIGN PATENT DOCUMENTS

CN 206074926 4/2017

OTHER PUBLICATIONS

International Search Report and the Written Opinion dated Sep. 19 For PCT/US2018/040954, Applicant Magic Leap, Inc., 7 pages.

(Continued)

*Primary Examiner* — Jason M Mandeville
(74) *Attorney, Agent, or Firm* — Vista IP Law Group LLP

(57) ABSTRACT

An imaging system includes a diffusing element configured to couple portions of a light beam back into a laser diode. The system includes a diode laser driven into a chaotic regime by a combination of a diffuser and a modulated drive current such that it emits light across a frequency spectrum having an envelope between 3 and 10 nanometers wide. The system further includes a diffusing element at least 0.1 mm to 0.5 mm away from the diode laser to couple portions of the light beam back into the laser diode. Another embodiment is directed to using the diffusing element to illuminate a flat panel display or a spatial light modulator.

15 Claims, 9 Drawing Sheets

(56) References Cited

U.S. PATENT DOCUMENTS

| | | | |
|---|---|---|---|
| 2008/0095203 A1* | 4/2008 | Bratkovski | H04N 9/3129 |
| | | | 372/26 |
| 2008/0198334 A1* | 8/2008 | Kasazumi | G03B 21/10 |
| | | | 353/38 |
| 2009/0225234 A1 | 9/2009 | Ward et al. | |
| 2010/0097534 A1* | 4/2010 | Teller | H04N 9/3129 |
| | | | 348/756 |
| 2010/0332575 A1* | 12/2010 | Kanter | G06F 7/588 |
| | | | 708/255 |
| 2011/0199686 A1 | 8/2011 | Fujisawa | |
| 2011/0221656 A1 | 9/2011 | Haddick et al. | |
| 2011/0317130 A1 | 12/2011 | Gollier | |
| 2012/0212499 A1 | 8/2012 | Haddick et al. | |
| 2012/0249970 A1 | 10/2012 | Ishimatsu et al. | |
| 2013/0050593 A1 | 2/2013 | Fujikawa et al. | |
| 2014/0028985 A1 | 1/2014 | Janssens et al. | |
| 2014/0055755 A1 | 2/2014 | Fan et al. | |
| 2014/0140654 A1 | 5/2014 | Brown et al. | |

OTHER PUBLICATIONS

Extended European Search Report for European Appln. No. 18828490.5 dated Jun. 8, 2020 (10 pages).

Foreign Response to EP Patent Appln. No. 18828490.5 dated Dec. 29, 2020.

* cited by examiner

SPECKLE-REDUCTION IN VIRTUAL AND AUGMENTED REALITY SYSTEMS AND METHODS

CROSS-REFERENCE TO RELATED APPLICATIONS

The present claims the benefit of priority to U.S. Provisional Application Ser. No. 62/529,223, filed on Jul. 6, 2017, the contents of which are hereby expressly and fully incorporated by reference in their entirety, as though set forth in full.

BACKGROUND

Modern computing and display technologies have facilitated the development of systems for so called "mixed reality," including "virtual reality" or "augmented reality," experiences, wherein digitally reproduced images or portions thereof are presented to a user in a manner wherein they seem to be, or may be perceived as, real. A virtual reality, or "VR", scenario typically involves presentation of digital or virtual image information without visibility of actual real-world visual surroundings, such that the user perceives only digital or virtual images without perceiving any light/images directly from the real world. An augmented reality, or "AR", scenario would involve presentation of digital or virtual image information as an augmentation to perception of the actual world around the user (i.e., with visibility of other actual real-world visual input), such that the user perceives the digital or virtual content as objects (i.e., virtual objects) in the real-world environment. Accordingly, AR scenarios involve presentation of digital or virtual image information accompanied with a view to other actual real-world visual input. The human visual perception system is very complex. As a result, producing a VR or AR technology that facilitates a comfortable, natural-feeling, and rich presentation of virtual image elements amongst other virtual or real-world imagery elements is challenging.

Speckle patterns are a type of intensity pattern produced by the mutual interference of a plurality of wavefronts emanating from a coherent source. Speckling refers to a random granular pattern that can be observed when a highly coherent light beam (e.g., from a laser) is diffusely reflected at a rough surface such as a piece of paper, white paint, a display screen, or a metallic surface. This phenomenon results from the interference of different reflected portions of the incident beam with random relative optical phases. A laser speckle structure is produced every time a laser beam passes through a diffuser or reflects from a diffuse-reflecting surface. The speckle structure depends on the coherent properties of laser radiation and occurs as a result of interference of a multitude of scattered waves of random initial phase.

Speckle patterns may severely degrade the image quality of projection displays that include laser light sources. Lasers create an interference pattern due to lasers being coherent narrow band light sources. As such, the quality of an image generated using projection displays with laser light sources may degrade because the laser light tends to interfere at various points. Additionally, interference generated by diffraction at a large number of scattering particles on the projection optics (e.g., dust) will also degrade image quality. The accumulation of degradation of the quality of images from various sources results in final images that appear grainy and distorted.

Thus, there is a need to reduce the laser speckling in a virtual reality or augmented reality system.

SUMMARY

Embodiments of the invention provide a system to reduce laser speckle by placing a diffuser in front of a laser diode to generate a chaotic laser pattern in the laser diode. The diffuser is a random pattern or pseudo random pattern surface which causes a plurality of light beam rays to bounce off the different locations of the diffused surface and scatter back into the laser diode to create a complex superposition of modes in the laser gain medium, thus initiating modal jumps in the laser resonator. These mode hops reduce coherence because each of them is linked to a slightly different emission frequency. The laser is also driven further into chaotic operation by a combination of the received optical feedback and the current modulation. In other embodiments, both the diffuser and the variation to the power from the laser act in concert to push the laser into chaos.

In one embodiment, an imagining system for reducing laser speckling includes a diode laser to generate a light beam, wherein the light beam has a wavelength within a visible spectrum. The system also includes a modulator to vary a current for driving the diode laser. The system further includes a diffuser to receive the light beam, wherein the diffuser is configured to reflect back a portion of the light beam into the laser diode as reflected light beams to generate a chaotic laser pattern.

In one or more embodiments, the modulator varies the current based at least on a second chaotic laser pattern. A variation in power of the modulator may be based at least on a structure of the diffuser. The system may also include a second diffuser disposed on an opposite side of the diffuser from the laser diode, where the second diffuser receives a second portion of the light beam. The system may also include a lens disposed on an opposite side of the diffuser from the laser diode to receive another portion of the light beam passing through the diffuser. The system may further include a multimode fiber disposed on an opposite side of the lens from the diffuser to modify a timing of the portion of the light beam as the portion of the light beam travels through the multimode fiber, the multimode fiber having a proximal end and a distal end, the distal end receiving the portion of the light beam after the portion of the light beam travels through the lens, the distal end corresponding to a light source.

In one or more embodiments, the system also includes a projection light source, a beam splitter disposed on an opposite side of the diffuser from the laser diode to receive light from the projection light source and the diffuser, and a micro-display for receiving light from the beam splitter. The micro-display may include at least one of liquid crystal on silicon or digital light processor. The system may also include a homogenizer to smooth out irregularities in the light beam to create a uniform pattern.

In another embodiment a near eye display system includes a laser diode. The system also includes a modulator coupled to the laser diode. The system further includes a diffuser optically coupled to the laser diode. Moreover, the system includes a 2D spatial light modulator optically coupled to the diffuser.

In one or more embodiments, the 2D spatial light modulator includes a Liquid Crystal on Silicon 2D spatial light modulator. The system may also include a waveguide eyepiece optically coupled to the 2D spatial light modulator.

The system may also include a projection lens disposed between a microdisplay and the waveguide eyepiece.

In one or more embodiments, the waveguide eyepiece includes an incoupling grating and the projection lens is positioned to couple light into the incoupling grating. The system may also include a polarization beam splitter disposed between the projection lens and the 2D spatial light modulator. The system may also include an illumination side collimating lens positioned between the diffuser and the polarization beam splitter.

16. The near eye display system of claim 11, where the waveguide eyepiece includes an incoupling grating and an exit pupil expansion grating that is coupled to the incoupling grating through the waveguide eyepiece.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE DRAWINGS

The drawings illustrate the design and utility of various embodiments of the present invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1A:
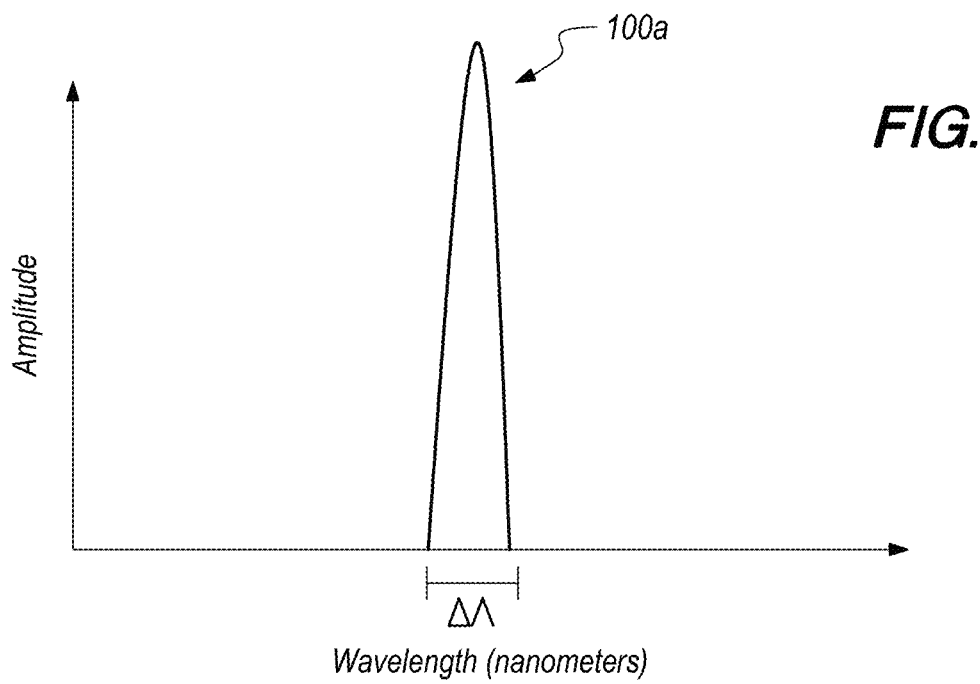
FIG. 1A depicts a graph of amplitude versus wavelength for a laser operating in a single mode, according to some embodiments.

Various embodiments will now be described in detail with reference to the drawings, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Numerous implementations are shown and described. To facilitate understanding, identical or similar structures are identified with the same reference numbers between the various drawings, even though in some instances these structures may not be identical.

The optical systems described herein may be implemented independently of Augmented Reality (AR) systems, but many embodiments below are described in relation to AR systems for illustrative purposes only.

Summary of Problem and Solution

The following disclosure describes various embodiments of systems and methods for mitigating laser speckling. According to certain embodiments, speckling is reduced by using a laser light source that is driven into a chaotic regime (a "coherence collapse regime"). One way of reducing laser speckling is to optimize a spectral line width. Another way to reduce laser speckling is to optimize a beam diameter. In particular, a diffusing element is used to couple a portion of emitted light back into the laser to create an optical feedback that results in the chaotic operation of the laser. A laser operating in a chaotic mode exhibits a wider frequency spectrum than a laser operating in a single mode. In certain embodiments described herein, a diffuser is used to cause a laser that would otherwise operate in a single mode to operate chaotically. In some embodiments, the current that is driving the laser is additionally modulated to increase the chaotic behavior of the laser.

Illustrative Optical Systems

Before describing the details of embodiments of the light distribution systems, a brief description of illustrative optical systems will be given. While the embodiments can be used with any optical system, specific systems (e.g., AR systems) are described to illustrate the technologies underlying the embodiments.

In order to present 3D virtual content to the user, the augmented reality (AR) system projects images of the virtual content into the user's eye so that they appear to originate from various depth planes spaced at various distances in front of the user (i.e., orthogonally away from the user's eye). In other words, the virtual content may not only extend in the X and Y directions (i.e., in a 2D plane orthogonal to a central visual axis of the user's eye), but may also appear to change in the Z direction depth such that the user may perceive an object to be close, at an infinite distance, or any distance in between. In other embodiments, the user may perceive multiple objects simultaneously at different depth planes. For example, the user may see a virtual dragon appear at a great distance and then run towards the user. Alternatively, the user may simultaneously see a virtual bird at a distance of 3 meters away from the user and a virtual coffee cup at arm's length (about 1 meter) from the user.

In certain embodiments, each eyepiece includes a transparent stack of waveguides. Each waveguide can be provided with an incoupling optical feature, outcoupling feature, and, optionally, one or more additional optical features for distributing light across the outcoupling features. Each particular waveguide outputs light at an angle corresponding to the angle at which the light was input into the particular waveguide. The stack of waveguides can include waveguides dedicated to particular color components (e.g., red, green or blue) and to imparting particular convex wavefront curvatures to exiting light. One way of imparting wavefront curvatures is to implement the outcoupling features as transmissive diffraction gratings with curved grating grooves, as taught in U.S. Provisional Patent Application Ser. No. 62/384,552, titled "Mixed Reality Systems Including Thick Media and Related Methods," filed on Sep. 9, 2016. Each wavefront curvature corresponds to a particular virtual image distance. Multiple virtual image distances can be generated by providing multiple waveguides that impart different curvatures. In one example, each eyepiece can include two sets of red, blue, and green dedicated waveguides. One of the two sets can be configured to impart a first wavefront curvature and a second of the two sets can be configured to impart a second wavefront curvature.

As will be explained in further detail below, light from a single mode laser is monochromatic and coherent. When such coherent light is reflected by a diffused surface that has some optical scale surface features, per Huygens' principle, each point on the surface becomes a virtual wave source, and waves from different points can constructively and destructively interfere. This results in creating an interference pattern also known as a speckle pattern.

FIG. 1a is a graph showing amplitude versus wavelength of a laser with one spectral linewidth. The spectral line shown in FIG. 1a, results from emissions of light in a narrow frequency range. Typically, a normal laser will emit a narrow spectral line (i.e., less than 1 nanometer) such as depicted as by narrow curve 100a in FIG. 1a. Lasers produce spatially and temporally coherent beams. This spatial coherence allows the light from lasers to be collimated into a small divergence diffraction limited beam. The narrow frequency spectrum (represented as $\Delta/\wedge$ in FIG. 1a) of a single mode coherent laser shows only one peak.

Figure 1B:
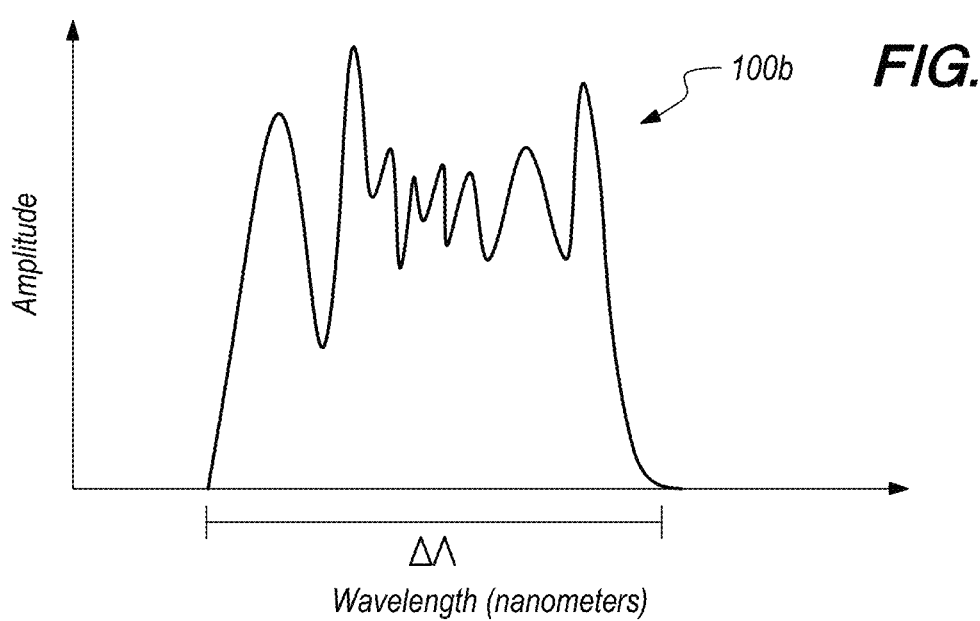
FIG. 1B depicts a graph of amplitude versus wavelength for a laser operating in a chaotic mode, according to some embodiments.

FIG. 1b is a graph showing the amplitude versus wavelength of a chaotic laser. The laser has a number of peaks 100b instead of having just a single peak (as compared to the narrow spectral line 100a in FIG. 1a). In some embodiments, the bandwidth of the light emitted by the laser ($\Delta/\wedge$) ranges between 2 nanometers to 15 nanometers. This wider wavelength range renders the laser much less coherent, which reduces the contrast of speckle patterns produced by light from the laser and makes the laser behave more like a conventional white light source. In contrast to coherent light, incoherent light does not have a fixed phase relationship between different spatial points in an emitted light beam. Chaotically mode hoping includes both temporal incoherence and spatial incoherence.

There may be several advantages of using a laser light source. In some embodiments, a laser light source may have less etendue than other light sources. In some embodiments, it may be easier to collimate light into a tight (e.g., small) spot for scanning displays by using a laser light source than compared to using other light sources. In some embodiments, a laser light source may be more efficient than other light sources.

In some embodiments, all photons emitted by a laser light source may be in phase and may be coherent to each other. These properties may create speckle, among other things. Each group of coherent photons may correspond to a mode. In some embodiments, a laser light source may have a single mode. For example, a laser light source may have a longitudinal mode in a spectrum domain. In some embodiments, a laser light source may have multiple modes. Coherence may be determined by how much of the spectrum a multiplicity of modes pass. For example, the more modes, the wider the spectrum, and the lower the coherence of the light. In some embodiments, it may be desirable to have a less coherent laser. A less coherent laser may be achieved by chaotically mode hopping the laser.

Referring to FIGS. 2A-2D, some general componentry options are illustrated. In the portions of the detailed description which follow the discussion of FIGS. 2A-2D, various systems, subsystems, and components are presented for addressing the objectives of providing a high-quality, comfortably-perceived display system for mixed reality (e.g., VR and/or AR).

Figure 2A:
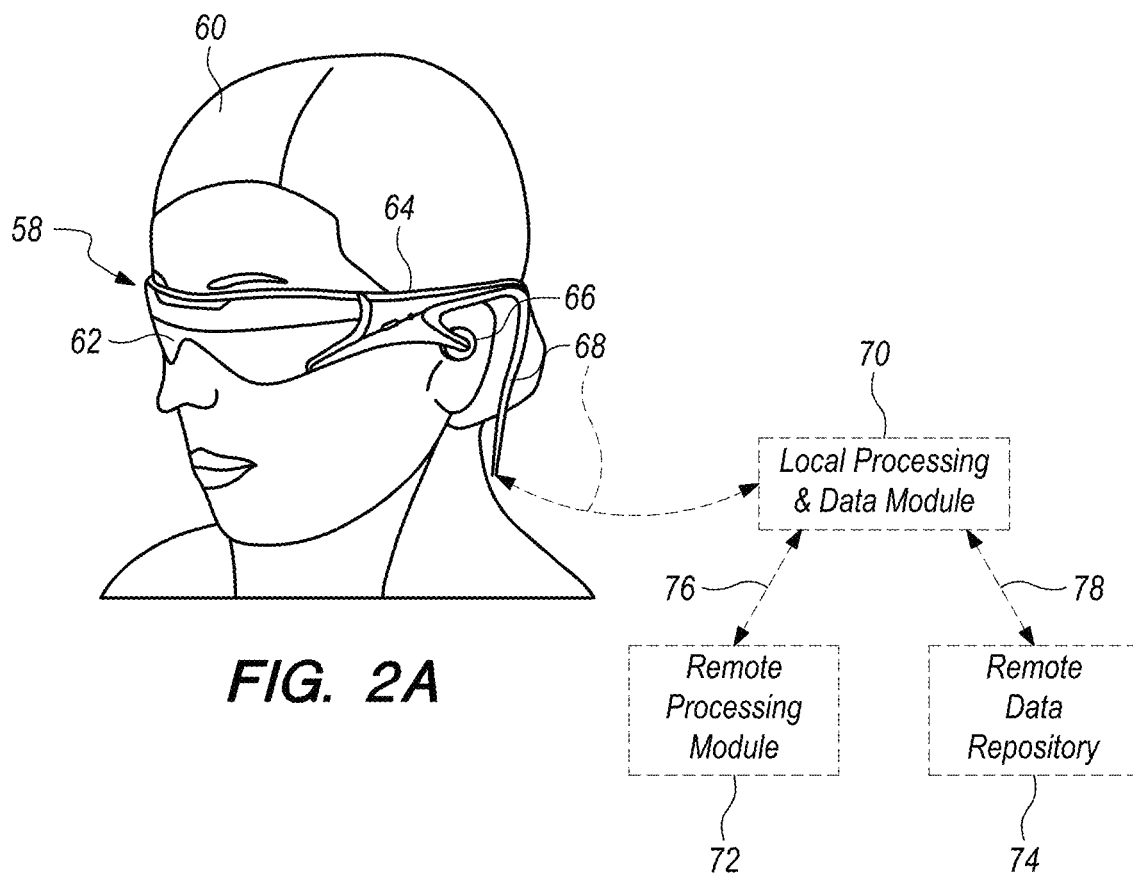
FIGS. 2A-2D schematically depict views of wearable AR devices, according to various embodiments.
Figure 2B:
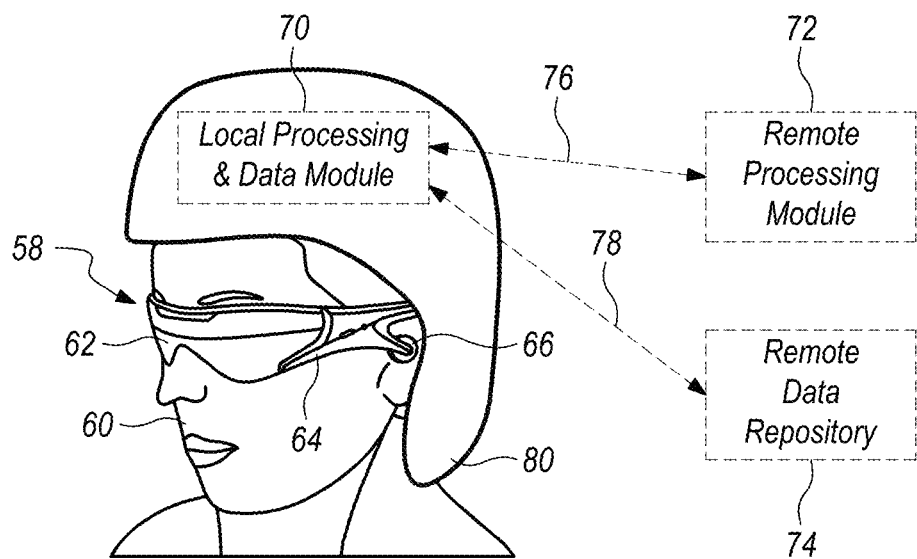
Figure 2C:
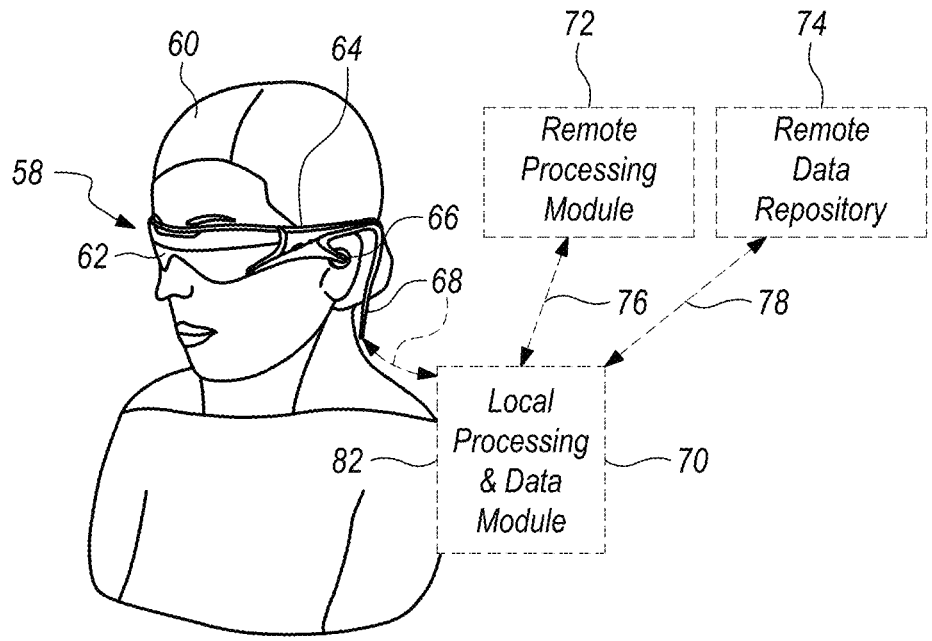
Figure 2D:
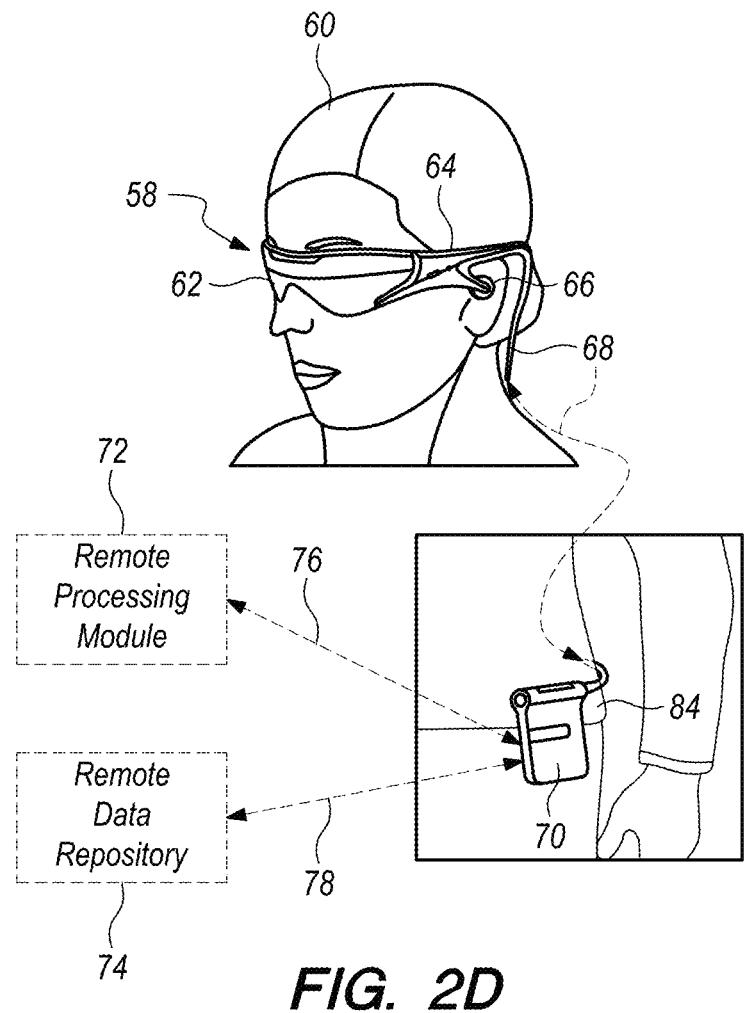

As shown in FIG. 2A, an AR system user 60 is depicted wearing a head mounted component 58 featuring a frame 64 structure coupled to a display system that includes an eyepiece waveguide 62 positioned in front of the eyes of the user. A speaker 66 is coupled to the frame 64 in the depicted configuration and positioned adjacent the ear canal of the user (in one embodiment, another speaker, not shown, is positioned adjacent the other ear canal of the user to provide for stereo/shapeable sound control). The display system may be operatively coupled 68, such as by a wired lead or wireless connectivity, to a local processing and data module 70 which may be mounted in a variety of configurations, such as fixedly attached to the frame 64, fixedly attached to a helmet or hat 80 as shown in the embodiment of FIG. 2B, embedded in headphones, removably attached to the torso 82 of the user 60 in a backpack-style configuration as shown in the embodiment of FIG. 2C, or removably attached to the hip 84 of the user 60 in a belt-coupling style configuration as shown in the embodiment of FIG. 2D.

The local processing and data module 70 may comprise a power-efficient processor or controller, as well as digital memory, such as flash memory, both of which may be utilized to assist in the processing, caching, and storage of data (a) captured from sensors which may be operatively coupled to the frame 64, such as image capture devices (such as cameras), microphones, inertial measurement units, accelerometers, compasses, GPS units, radio devices, and/or gyros; and/or (b) acquired and/or processed using the remote processing module 72 and/or remote data repository 74, possibly for passage to the display after such processing or retrieval. The local processing and data module 70 may be operatively coupled 76, 78, such as via a wired or wireless communication links, to the remote processing module 72 and remote data repository 74 such that these remote modules 72, 74 are operatively coupled to each other and available as resources to the local processing and data module 70.

In one embodiment, the remote processing module 72 may comprise one or more relatively powerful processors or controllers configured to analyze and process data and/or image information. In one embodiment, the remote data repository 74 may comprise a relatively large-scale digital data storage facility, which may be available through the internet or other networking configuration in a "cloud" resource configuration. In one embodiment, all data may be stored and all computation may be performed in the local processing and data module, allowing fully autonomous use from any remote modules.

As described with reference to FIGS. 2A-2D, the AR system continually receives input from various devices that collect data about the AR user and the surrounding environment. One of the inputs that may be received is a light source from the various embodiments of diffuser systems for minimizing laser speckling in AR and other mixed reality systems, as will be explained in further detail below.

Figure 3:
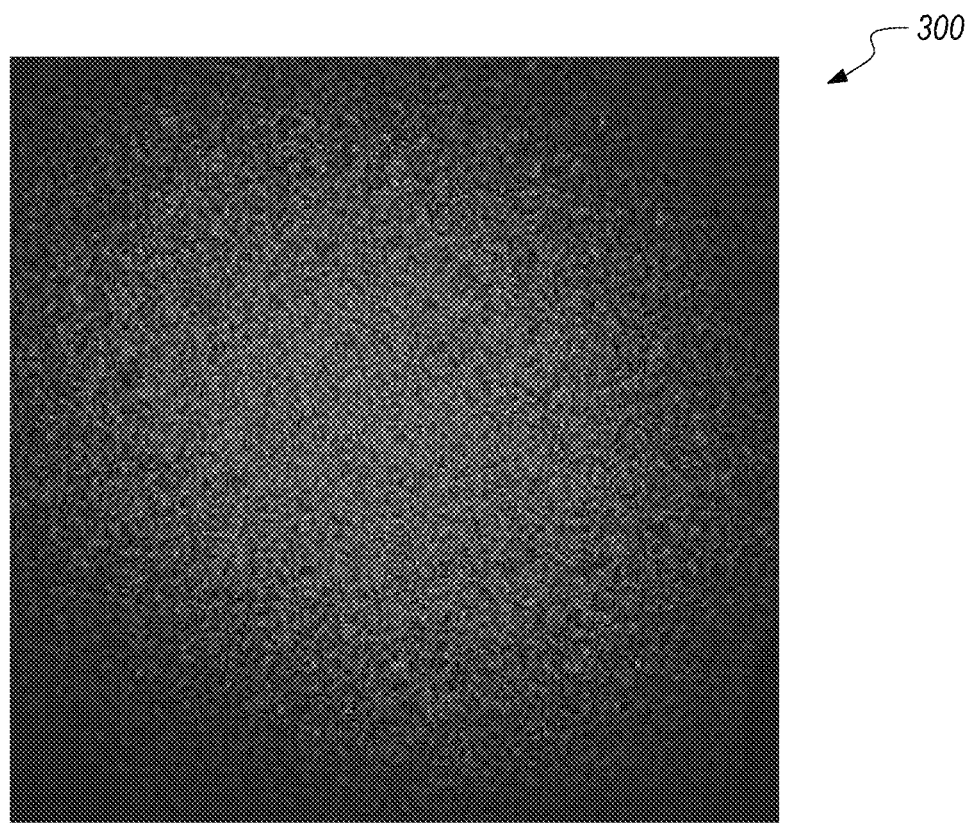
FIG. 3 depicts an exemplary speckle pattern, according to some embodiments.

FIG. 3 is an illustration of a laser speckle pattern from a conventional coherent laser beam. Laser speckling 300 refers to random granular patterns that are observed when a highly coherent light beam is diffusely reflected at a complicated surface (e.g. rough surface) such as a metallic surface, a display screen, white paint, or piece of paper. As shown, the random granular patterns are composed of a random distribution of bright and dark spots.

These speckle patterns 300 appear as unwanted granular noise on projected images and can severely degrade the image quality of projection display system that use laser illumination. The speckle patterns result from the interference of different reflected portions of an incident beam, which may have random relative optical phases due to the differences in their travel path. The interference from the reflected portions may also contribute to the varying intensity for each pixel of a display system that uses a laser illumination source.

An approach to generating laser diode chaos is to use external optical feedback. Scaling of time-delay with respect to an internal timescale of a laser and sensitivity of a phase of a returning field from the external optical feedback leads to chaos. In some embodiments, a delayed reflection back into a laser and its interaction with a field within a gain medium may lead to chaos. However, in practice, this approach does not succeed in eliminating speckle patterns entirely because, as an example, broadening of an emissions spectrum may not be enough.

Figure 4:
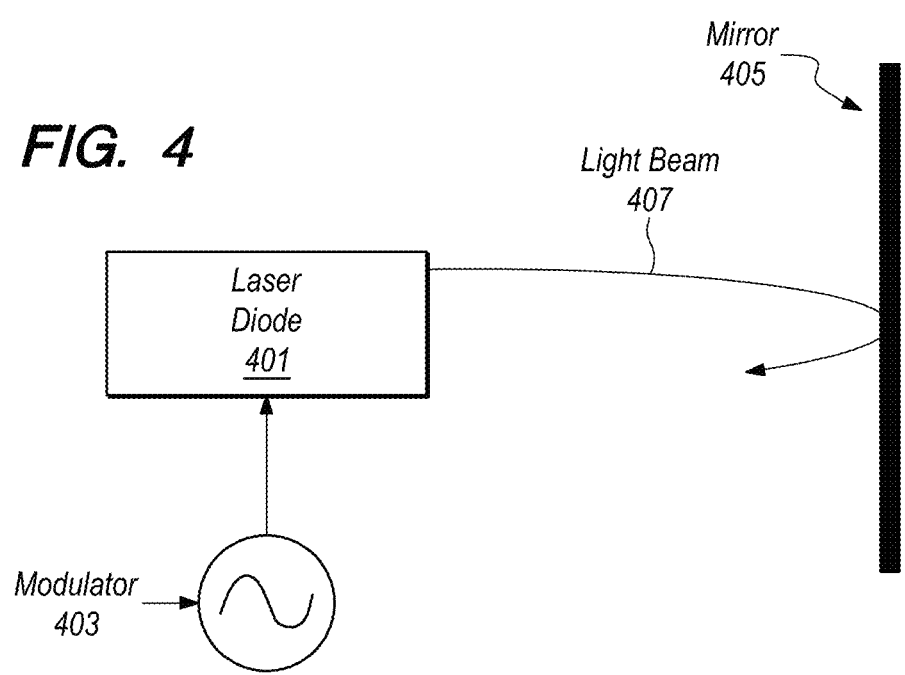
FIG. 4 schematically depicts an alternative approach to reducing laser speckle, according to some embodiments.

FIG. 4 shows a schematic of an optical system for reducing laser speckle with a mirror, according to some embodiments. The optical system includes a laser diode 401 including a laser that is driven by a modulator 403, and an external optical feedback mechanism (including a mirror 405). The laser diode 401 emits a laser light beam 407. Under the right conditions, laser light beam 407 may bounce off the mirror 405 to return a small fraction of the laser emission back into the laser diode 401. The reflection back into the laser diode 401 may result in some chaotic output with different types of waveforms and properties. The feedback may be provided either from a simple external mirror or with more complex configurations leading to different routes to chaos. This embodiment may not be very efficient in eliminating laser speckle because a single reflection from the mirror 405 into the laser diode 401 may not create a modal pattern in the laser diode 401 that is complex enough to excite a large number of chaotic modes.

Figure 5:
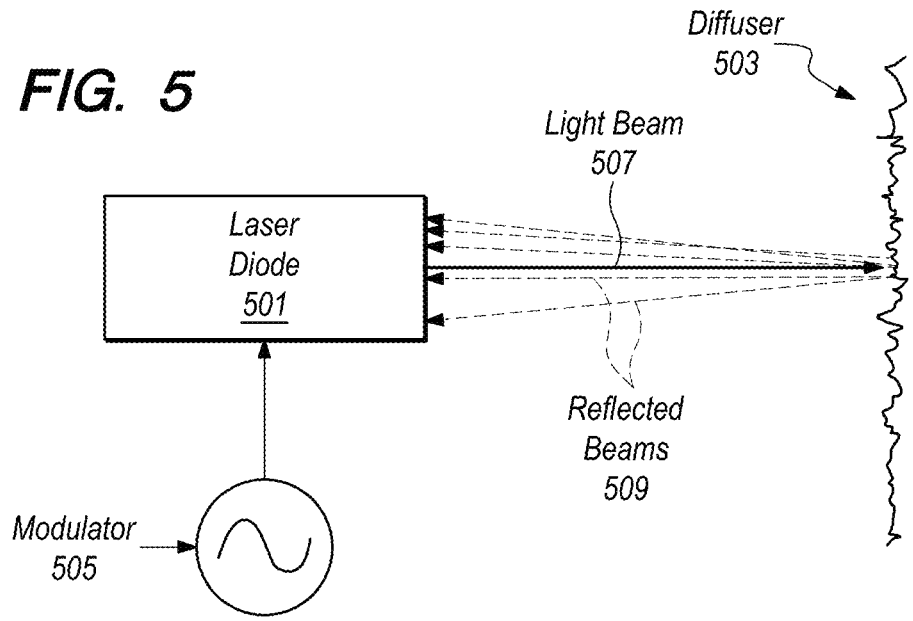
FIG. 5 schematically depicts an optical system for reducing laser speckle with one diffuser, according to some embodiments.

FIG. 5 shows a schematic of an optical system for reducing laser speckle with a diffuser, according to some embodiment. The system includes a laser diode 501 including a laser that is driven by a modulator 505, and an external optical feedback mechanism (including a diffuser 503). The laser diode 501 emits a laser light beam 507 with one or more wavelengths, which are typically within 5 nanometers of each other. In some embodiments, the diffuser 503 may be anywhere between 0.1 to 2 millimeters away from the laser diode 501. In some embodiments, a beam diameter of the laser light beam 507 may be typically 50 to 500 microns. The diffuser 503 may be made stable by being mounted in a fixture that does not allow the diffuser 503 to move. The laser diode 501 will not operate in a chaotic mode if the diffuser 503 moves relative to the laser diode 501. The laser diode 501 must be stable because the reflected modes may not be coherent with the modes inside the laser diode 501 (and thus cannot interfere to create chaos) if the diffuser 503 moves relative to the laser diode 501. As such, in some embodiments, the laser diode 501 has zero velocity relative to the diffuser 503 so that the reflected modes and modes inside the laser diode 501 can interfere and create a chaotic pattern.

The diffuser 503 is a random or pseudo random pattern that diffuses light. The diffuser 503 is particularly suitable for creating a chaotic pattern because of the uneven diffused surface. In some embodiments, the diffuser 503 is a reflective diffuser.

The diffuser 503 causes one or more randomly reflected rays 509 to reflect back into the laser diode 501. The diffuser 503 couples the reflected rays 509 back into the laser diode 501 due to the uneven surface of the diffuser 503, but most of the light will pass through the diffuser 503. The photons associated with the reflected rays 509 bounce back from each part of the surfaces of the diffuser 503 to create a number of beams of scattered light in the reflected rays 509. In some embodiments, 2-4% of the light impingement on the diffuser 503 will be reflected back toward the laser diode 501. The diffuser 503 scatters light back into the laser diode 501 to create a complex superposition of modes in a laser gain medium, thus initiating modal jumps in the laser resonator. These modal jumps reduce coherence because each of them is linked to a slightly different emission frequency.

The modulator 505 is coupled to the laser diode 501 and drives the laser diode 501 with a modulated current. The modulator 505 acts in concert with the diffuser 503 to add to the chaotic laser pattern. Each laser diode will act a bit differently from others, but modulation may promote chaotic operation of the laser diode 501. Light emission, spread over a total spectral wavelength range of 3-5 nanometers, is created from a combination of the modulator 505, a pattern of the diffuser 503, and other characteristics and properties of a laser diode 501. The parameters that correspond to the modulation waveform, texture of the diffuser 503, and reflectivity of the diffuser 503 determine the amount of reduction of the speckling. The output of the modulator 505 is coupled to the laser diode 501. The modulator 505 may, for example, modulate light at a frequency in the range of 10 kHz to 10 MHz. The time modulation rate should be much faster than the framerate of the display system so that the chaotic light evens out in each image frame. Without modulation, light emitted by the laser diode 501 is less broad, but modulation allows the display system to get a spectral wavelength of up to 10 nanometers.

In some embodiments, both the diffuser 503 and the variation of power to the laser diode 501 act in concert to push the laser light emitted by the laser diode 501 into chaos. The majority of the variation in power of the laser diode 501 may result from a modulation signal from the modulator 505, but the diffuser 503 may also cause internal power fluctuations of the laser diode 501. Diffusers with different structures may cause the modulator to have both different spectra of power variation and time variation because different diffusers can produce different spectral power distributions. In some embodiments, a feature size of diffusers may be in the range of 1 to 100 microns.

In some embodiments, a combination of feedback from the diffuser 503 to the laser diode 501 via the reflected rays 509 along with modulation in amplitude and frequency of current by the modulator 505 drives laser pattern from the laser diode 501 to be chaotic. The reflected rays 509 can include repeated patterns, and pseudo random patterns. Specifically, the interaction between the current modulation and the reflected rays 509 causes the laser to be chaotic. In some embodiments, approximately 4% of the light from the laser diode 501 will reflect off the diffuser 503 and return back to the laser diode 501 as reflected rays 509, and some of the light will be diffused through the diffuser 503. The reflected rays 509 interfere with different modes of the laser diode 501 to drive the light into chaos.

Figure 6:
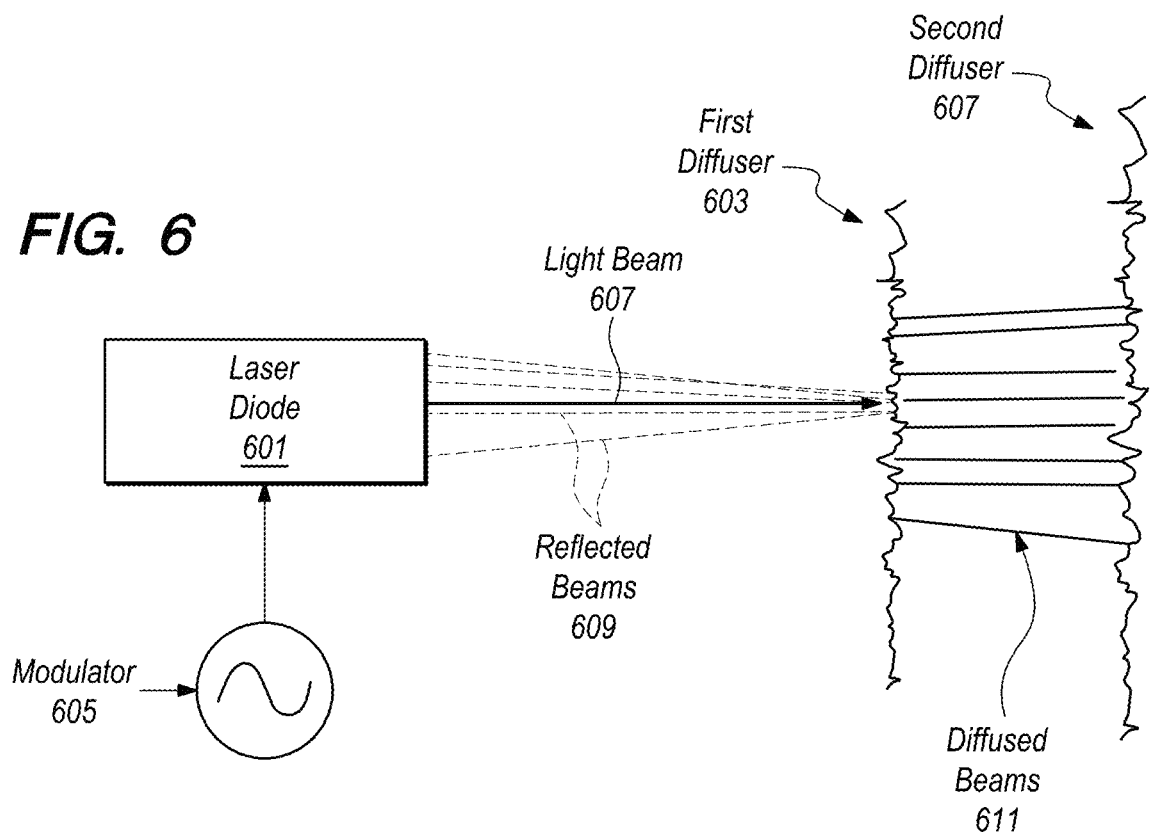
FIG. 6 schematically depicts an optical system for reducing laser speckle with two diffusers, according to some embodiments.

FIG. 6 shows a schematic of an optical system for reducing laser speckle with two diffusers, according to some embodiments. A second diffuser 607 is placed behind a first diffuser 603 to help diffused beams 611 become more uniform.

A pseudo-random diffused surface of the first diffuser 603 causes reflected rays 609 to reflect back into a laser diode 601. The photons associated with the reflected rays 609 bounce back from each part of the first diffuser 603 to create a number of reflected rays 609 to scatter the light. The diffused beams 611 (e.g., light that passes through the first diffuser 603) will enter the second diffuser 607. The modulator 605 also contributes to create a less speckled pattern due to the chaotic laser pattern.

The first diffuser 603 and the variation of the power to the laser diode 601 act in concert to push the light into chaos. In some embodiments, a combination of feedback from a back scattered light pattern (e.g., the reflected rays 609) and modulation of the laser current by the modulator 605 drives the laser pattern to be chaotic. The first diffuser 603 can include repeating patterns, and random or pseudo random patterns. The interaction of the modulation from the modulator 605 and the reflected rays 609 reflected by the first diffuser 603 causes the laser diode 601 to be chaotic. When the reflected rays 609 are reflected back into the laser diode 601, they may interfere with the different modes of the laser diode 601.

Figure 7A:
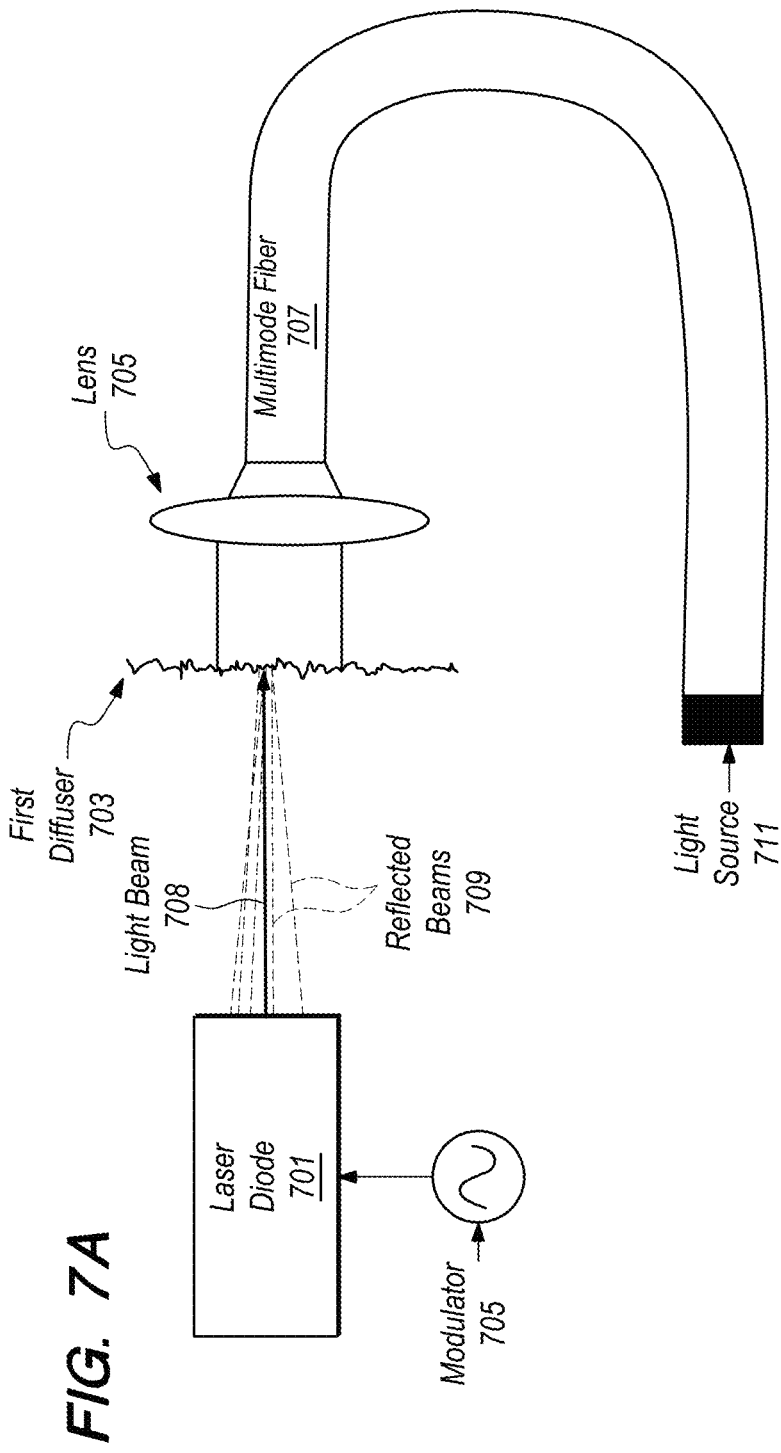
FIGS. 7A-B schematically depict an optical system for reducing laser speckle with a multi-mode fiber, according to some embodiments.
Figure 7B:
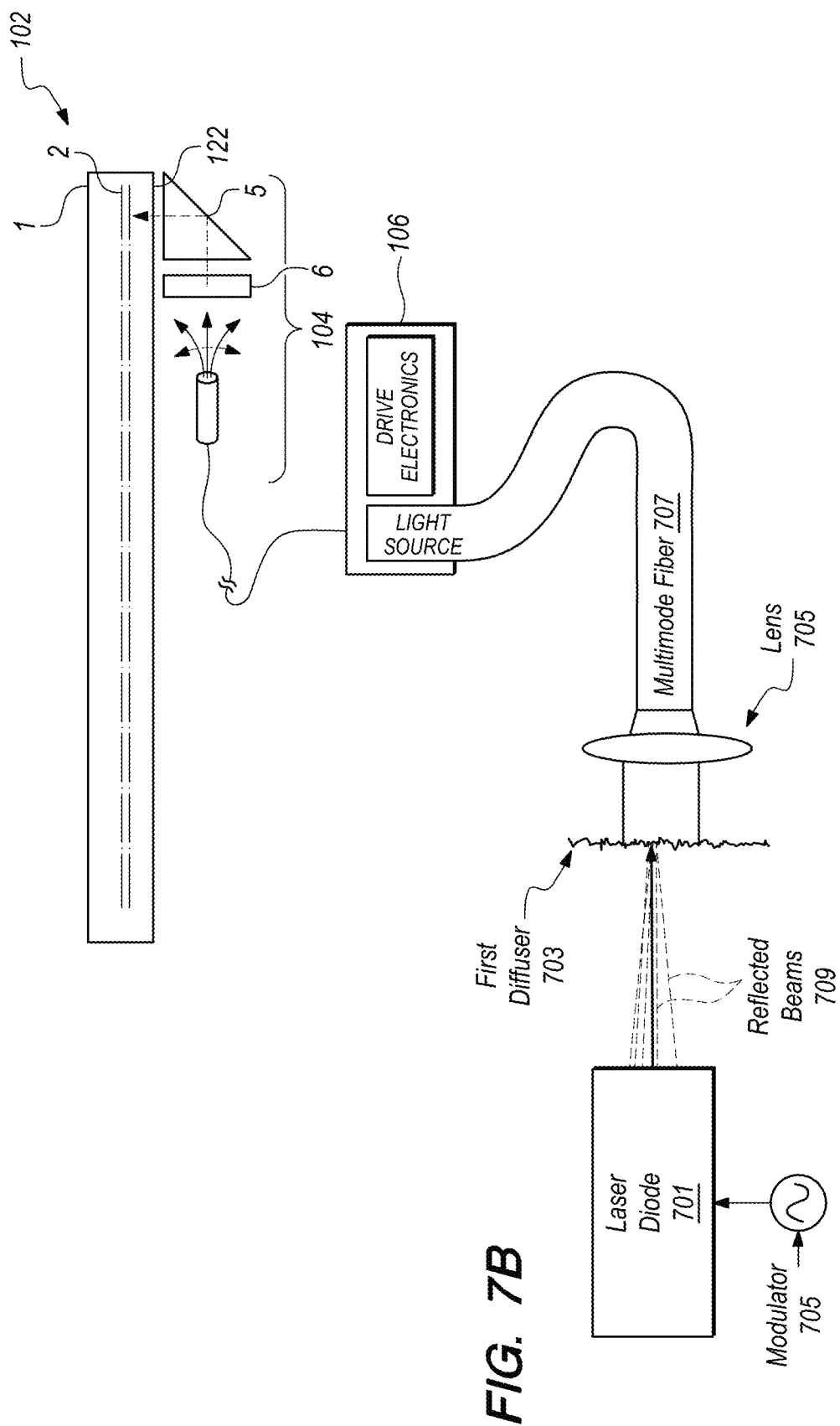

FIG. 7A-B show a schematic of an optical system for reducing laser speckle with an optical multimode fiber, according to some embodiments. An optical multimode fiber 707 is a type of optical fiber designed to carry multiple light rays or modes concurrently. Most multimode fibers have a large core diameter that helps enable multiple light modes to propagate at slightly different reflection angles within an optical fiber core.

FIG. 7A shows a pseudo-random first diffuser 703 that causes a reflected ray 709 to reflect back into a laser diode 701. The photons from the light beam 708 bounce back from each part of the first diffuser 703 to cause a number of reflected rays 709 to scatter the light. A modulator 705 also contributes to create a less speckled pattern due to the chaotic laser pattern.

A laser from the laser diode 701, which is driven by the modulator 705, passes through the first diffuser 703. The light beams passing through the first diffuser 703 also pass through a separate condensing lens 705 before entering a multimode fiber 707 and propagating therethrough. The lens 705 helps to couple light into the multimode fiber 707.

Passing light through the multimode fiber 707 may further homogenize the light. In some embodiments, the light output from the multimode fiber 707 can be used to illuminate a spatial light modulator used in augmented reality glasses.

FIG. 7B shows schematic representation of an optical system of augmented reality glasses, according to some embodiments. The optical system of the augmented reality glasses may include an eyepiece waveguide 102, an optical coupler subsystem 104, and a control subsystem 106. The waveguide 102 includes one or more primary planar waveguides 1, and one or more diffractive optical elements (DOEs) 2 associated with each of at least some of the primary planar waveguides 1.

The optical coupler subsystem 104 optically couples light into the waveguide 102 by coupling image wise modulated light to a user's eye. As illustrated in FIG. 7B, the optical coupler subsystem 104 may include an optical element 5, for instance a reflective surface, mirror, dichroic mirror, or prism, to optically couple light into an edge 122 of the primary planar waveguide 1. The optical coupler subsystem 104 may additionally or alternatively include a collimation element 6 that collimates light from one or more light source (e.g., the multimode fiber 707 which delivers light from the laser diode 701).

The control subsystem 106 includes one or more light sources and drive electronics that generate image data that is encoded in the form of light that is spatially and/or temporally varying. As noted above, the collimation element 6 may collimate the light, and the collimated light is coupled into one or more primary planar waveguides 1. While a specific laser diode 701/diffuser 703 combination is depicted in FIG. 7B as the light source, other embodiments of diffuser systems for minimizing laser speckling, such as those described in other areas of the specification, may also function as light sources.

Figure 8:
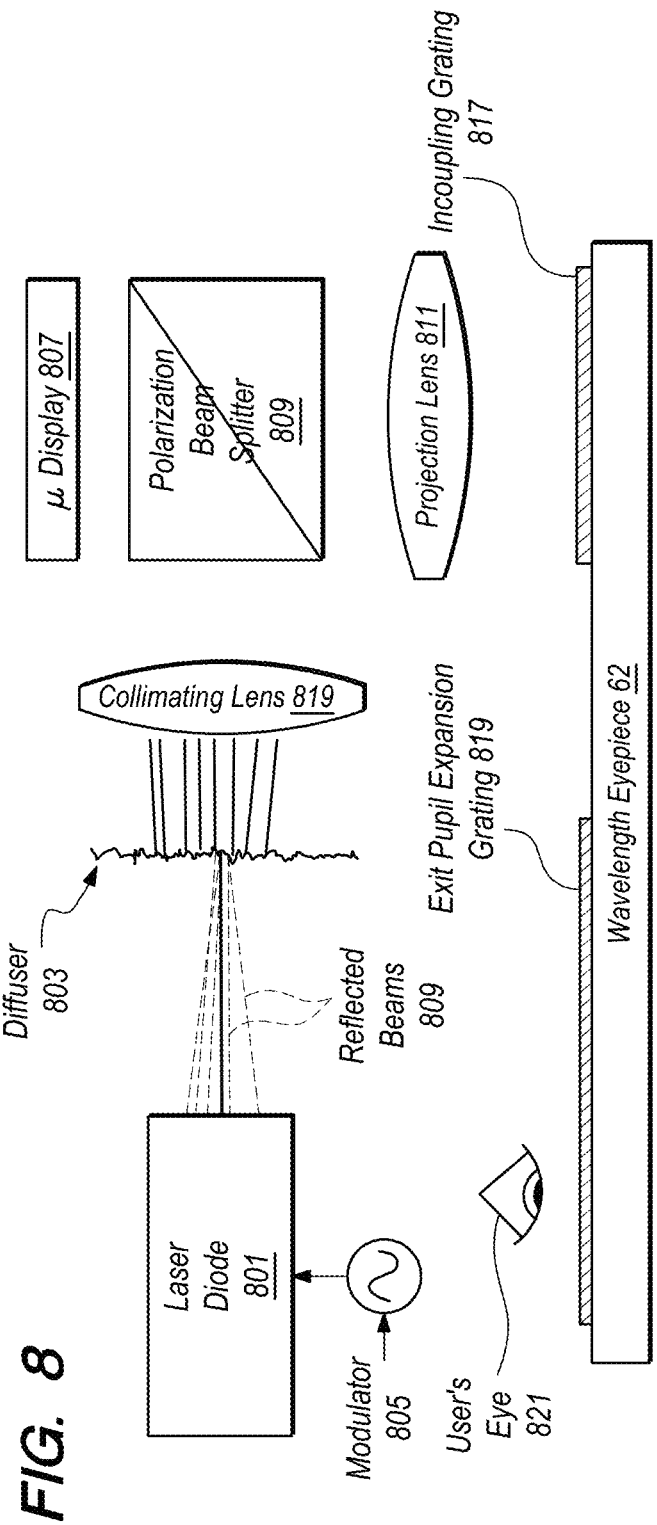
FIG. 8 schematically depicts an optical system for reducing laser speckle by using a light source, according to some embodiments.

FIG. 8 shows a schematic of an optical system for reducing laser speckle to illuminate a flat panel display, according to some embodiments.

FIG. 8 shows a laser diode 801 driven by a modulator 805. The laser diode 801 emits one or more wavelengths, which are typically within 5 nanometers of each other. In some embodiments, the diffuser 803 may be anywhere between 0.1 to 2 millimeters away from the laser diode 801. The diffuser 803 may be made stable by being mounted in a support that does not allow the diffuser 803 to move relative to the laser diode 801. Fixing the position of the diffuser 803 relative to the laser diode 801 is beneficial in causing the laser diode 801 to operate in a chaotic mode. If the diffuser 803 moves relative to the laser diode 801, reflected rays 809 reflected by the diffuser 803 may not be coherent with respect to modes of the laser diode 801.

During operation, the modulator 805 supplies a drive signal to the laser diode 801. The laser diode 801 emits light which is mostly transmitted through the diffuser 803. The laser diode 801 is optically coupled (as shown by free space propagation, but alternatively, via optical elements) to the diffuser 803. The reflected rays 809 (a portion of the light emitted by the laser diode 801 that reflected by the diffuser 803) is coupled into the laser diode 801. The modulation of the drive signal in combination with the reflected rays 809 causes the laser diode 801 to operate in a chaotic (reduced coherence mode).

After passing through the diffuser 803, light is optically coupled through an illumination side collimating lens 819 and polarization beam splitter (PBS) 809 to a microdisplay (a two dimensional (2D) spatial light modulator) 807 which spatially modulates the light to present an image. The microdisplay includes a 2D array of pixels (not visible in FIG. 8). The microdisplay 807 may, for example, take the form of a Liquid Crystal on Silicon (LCoS) spatial light modulator (SLM). Alternatively, a Digital Micromirror Device (DMD) can be used as the microdisplay 807 in which case the PBS 809 can be replaced with an arrangement of two opposed prisms separated by an air gap. The DMD selectively deflects light to angles above and below an angle of total internal reflection at a face of a proximate one of the two opposed prisms that faces the air gap. The light is reflected back through the PBS 809 by the microdisplay 807 to a projection lens 811. The projection lens 811 forms a collimated beam from the light modulated by each pixel of the microdisplay 807. The collimated light produced from the microdisplay 807 by each particular pixel propagates at an angle determined by the location of the particular pixel. Thus, the projection lens 811 forms a virtual image located at infinity. Light collimated by the projection lens 811 is coupled to an incoupling optical element (grating) 817 located on a surface of a waveguide eyepiece 62. Thus, the microdisplay 807 is optically coupled through an optical path that traverses the PBS 809 and the projection lens 811 to the incoupling grating 817. Light is coupled via the waveguide eyepiece 62 containing an exit pupil expansion grating 819 which incrementally outcouples the light to a user's eye 821.

The diffuser 803 can have a random or pseudo-random profiled surface that causes reflected rays 809 to reflect back into the laser diode 801. The photons associated with the reflected rays 809 create reflectively scattered light. The modulator 805 also contributes to create a less speckled pattern causing mode hopping of the laser diode 801 to be more chaotic.

Speckling may be avoided by using a light source. The light coming out from the diffuser 803 will pass through the PBS 809 to illuminate a flat panel display (e.g., the microdisplay 807). The light beams from the first diffuser 803 may also be used to directly illuminate the micro-display 807, such as LCoS or Digital Light Processor (DLP), to eliminate a flat panel display.

Figure 9:
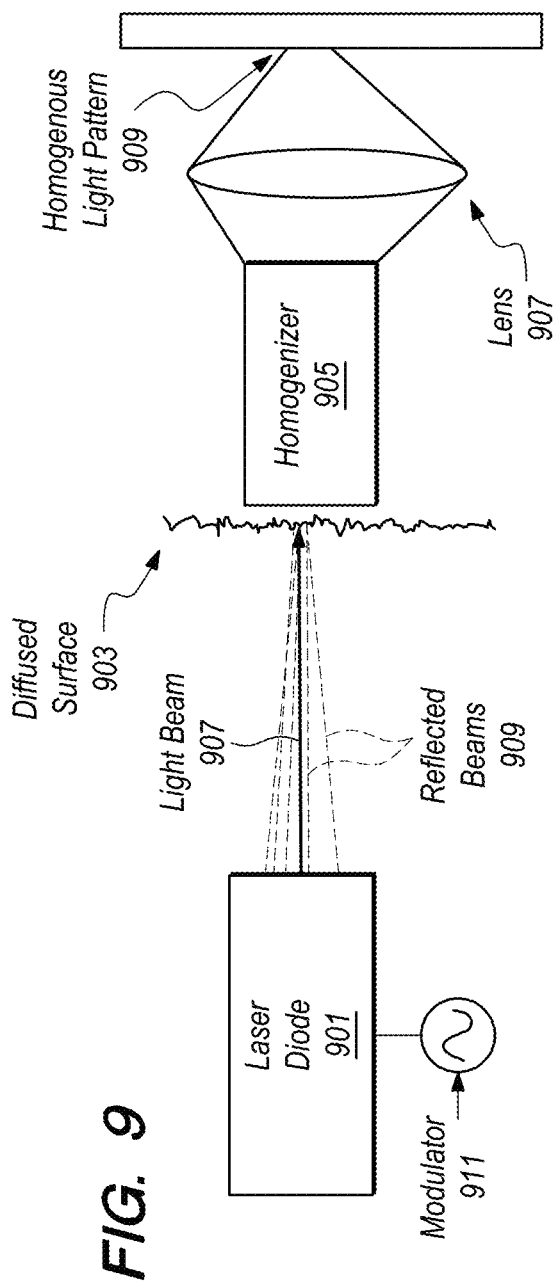
FIG. 9 schematically depicts an optical system for reducing laser speckle with a homogenizer, according to some embodiments.

FIG. 9 shows a schematic of an optical system for reducing laser speckle with a homogenizer, according to some embodiments. A homogenizer 905 is a device that smooths out irregularities in a laser beam profile to create a more uniform pattern. Many homogenizers use a multifaceted mirror with square facets. The mirror reflects light at different angles to create a beam with uniform power across the whole beam profile.

A laser diode 901 is driven by a modulator 911. The laser diode 901 emits one or more wavelengths, which are typically within 5 nanometers of each other. In some embodiments, a diffuser 903 may be anywhere between 0.1 to 2 millimeters away from the laser diode 915. The diffuser 903 may be made stable by being mounted in a fixture that does not allow it to move relative to the laser diode 901. The laser diode 901 may not operate in a chaotic mode if the diffuser 903 is not securely attached relative to the laser diode 901 and moves relative thereto during operation.

FIG. 9 also shows a diffuser 903 with a pseudo-random diffused surface that causes reflected rays 909 to reflect back into the laser diode 901. The photons from the reflected rays 909 bounce back from each part of the diffused surface 903 to create scattered light. The modulator 911 also contributes to create a less speckled pattern due to the chaotic laser pattern.

In some embodiments, the homogenizer 905 causes the light coming out from the diffuser 903 to be homogenized. The light is then re-imaged through a lens 907 to refocus the light onto a surface. This results in reducing laser speckle while having more homogenous light for projecting an image.

Various exemplary embodiments of the invention are described herein. Reference is made to these examples in a non-limiting sense. They are provided to illustrate more broadly applicable aspects of the invention. Various changes may be made to the invention described and equivalents may be substituted without departing from the true spirit and scope of the invention. In addition, many modifications may be made to adapt a particular situation, material, composition of matter, process, process act(s) or step(s) to the objective(s), spirit or scope of the present invention. Further, as will be appreciated by those with skill in the art that each of the individual variations described and illustrated herein has discrete components and features which may be readily separated from or combined with the features of any of the other several embodiments without departing from the scope or spirit of the present inventions. All such modifications are intended to be within the scope of claims associated with this disclosure.

The invention includes methods that may be performed using the subject devices. The methods may comprise the act of providing such a suitable device. Such provision may be performed by the end user. In other words, the "providing" act merely requires the end user obtain, access, approach, position, set-up, activate, power-up or otherwise act to provide the requisite device in the subject method. Methods recited herein may be carried out in any order of the recited events which is logically possible, as well as in the recited order of events.

Exemplary aspects of the invention, together with details regarding material selection and manufacture have been set forth above. As for other details of the present invention, these may be appreciated in connection with the above-referenced patents and publications as well as generally known or appreciated by those with skill in the art. The same may hold true with respect to method-based aspects of the invention in terms of additional acts as commonly or logically employed.

In addition, though the invention has been described in reference to several examples optionally incorporating various features, the invention is not to be limited to that which is described or indicated as contemplated with respect to each variation of the invention. Various changes may be made to the invention described and equivalents (whether recited herein or not included for the sake of some brevity) may be substituted without departing from the true spirit and scope of the invention. In addition, where a range of values is provided, it is understood that every intervening value, between the upper and lower limit of that range and any other stated or intervening value in that stated range, is encompassed within the invention.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A near eye display system, comprising:
   a laser diode configured to generate a light beam, wherein the light beam has a wavelength within a visible spectrum;
   a modulator coupled to the laser diode, the modulator configured to vary a current for driving the laser diode;
   a diffuser optically coupled to the laser diode, wherein the diffuser comprises a random patterned surface or a pseudo-random surface configured to cause a plurality of light beams including the light beam to bounce off the random patterned surface or the pseudo-random surface and scatter back into the laser diode as reflected beams to generate a chaotic laser pattern; and
   a 2D spatial light modulator optically coupled to the diffuser,
   wherein the diffuser is also configured to allow a transmitted portion of the light beam to pass therethrough and onto the 2D spatial light modulator.

2. The near eye display system of claim 1, wherein the modulator varies the current based at least on a second chaotic laser pattern.

3. The near eye display system of claim 2, wherein a variation in power of the modulator is based at least on a structure of the diffuser.

4. The near eye display system of claim 1, further comprising:
   a second diffuser disposed on an opposite side of the diffuser from the laser diode, wherein the second diffuser receives a second portion of the light beam.

5. The near eye display system of claim 1, further comprising:
   a lens disposed on an opposite side of the diffuser from the laser diode to receive a second portion of the light beam passing through the diffuser; and
   a multimode fiber disposed on an opposite side of the lens from the diffuser to modify a timing of the second portion of the light beam as the second portion of the light beam travels through the multimode fiber, the multimode fiber having a proximal end and a distal end, the distal end receiving the second portion of the light beam after the second portion of the light beam travels through the lens, the distal end corresponding to a light source.

6. The near eye display system of claim 1, further comprising:
   a projection light source;
   a beam splitter disposed on an opposite side of the diffuser from the laser diode to receive light from the projection light source and the diffuser; and
   a micro-display for receiving light from the beam splitter.

7. The near eye display system of claim 6, wherein the micro-display comprises at least one of liquid crystal on silicon or digital light processor.

8. The near eye display system of claim 1, further comprising a homogenizer to smooth out irregularities in the light beam to create a uniform pattern.

9. The near eye display system of claim 1, wherein the 2D spatial light modulator comprises a Liquid Crystal on Silicon 2D spatial light modulator.

10. The near eye display system of claim 1, further comprising a waveguide eyepiece optically coupled to the 2D spatial light modulator.

11. The near eye display system of claim 10, further comprising a projection lens disposed between a microdisplay and the waveguide eyepiece.

12. The near eye display system of claim 11, wherein the waveguide eyepiece includes an incoupling grating and the projection lens is positioned to couple light into the incoupling grating.

13. The near eye display system of claim 11, further comprising a polarization beam splitter disposed between the projection lens and the 2D spatial light modulator.

14. The near eye display system of claim 13, further comprising an illumination side collimating lens positioned between the diffuser and the polarization beam splitter.

15. The near eye display system of claim 10, wherein the waveguide eyepiece includes an incoupling grating and an exit pupil expansion grating that is coupled to the incoupling grating through the waveguide eyepiece.

* * * * *